United States Patent [19]

Forrest et al.

[11] Patent Number: 5,276,869
[45] Date of Patent: Jan. 4, 1994

[54] SYSTEM FOR SELECTING DOCUMENT RECIPIENTS AS DETERMINED BY TECHNICAL CONTENT OF DOCUMENT AND FOR ELECTRONICALLY CORROBORATING RECEIPT OF DOCUMENT

[75] Inventors: Bradley A. Forrest; Dean J. Hager; Curtis G. Rose, all of Rochester, Minn.

[73] Assignee: International Business Machines Corporation, Armonk, N.Y.

[21] Appl. No.: 580,336

[22] Filed: Sep. 10, 1990

[51] Int. Cl.$^5$ .............................................. G06F 13/00
[52] U.S. Cl. .............................. 395/600; 364/419.01; 364/225.6; 364/222.2; 364/DIG. 1; 395/200
[58] Field of Search ............... 395/275, 200, 100, 600, 395/650; 340/721; 364/419

[56] References Cited

U.S. PATENT DOCUMENTS

| | | | |
|---|---|---|---|
| 4,503,499 | 3/1985 | Mason | 395/650 |
| 4,881,197 | 11/1989 | Fischer | 395/600 |
| 4,977,520 | 12/1990 | McGaughey, III et al. | 395/100 |
| 5,040,142 | 8/1991 | Mori et al. | 395/275 |
| 5,125,075 | 6/1992 | Goodale et al. | 395/200 |
| 5,181,162 | 1/1983 | Smith et al. | 395/600 |

Primary Examiner—Thomas C. Lee
Assistant Examiner—Jennifer Orzech
Attorney, Agent, or Firm—Andrew J. Dillon

[57] ABSTRACT

A selective review and electronic corroboration of invention disclosure documents within a distributed data processing system. A selected document is identified and a document profile is created, including at least an identification of the technical or functional area disclosed within that document. Thereafter, the document and document profile are transmitted to an evaluation facility where a unique identifier is assigned to the document and the document is then automatically distributed to a preselected list of users, in accordance with the technical or administrative area information contained within the document profile. Each recipient of the document is then prompted to enter an indication of having read and understood the document at his or her computer terminal. Positive responses to this prompt are then stored in association with the uniquely identified document so that the document may be electronically corroborated at a subsequent time by a reference thereto. In a preferred embodiment of the present invention, this method and apparatus may be utilized to electronically "witness" an invention disclosure document to corroborate the date of conception of an invention.

2 Claims, 5 Drawing Sheets

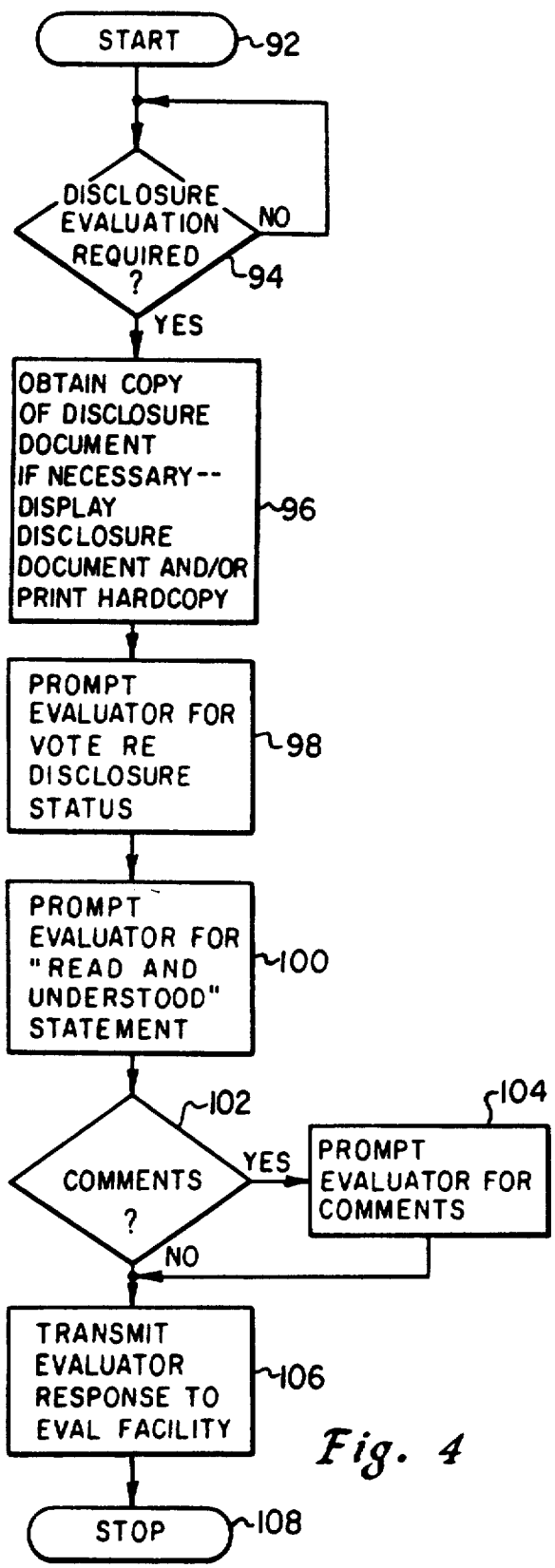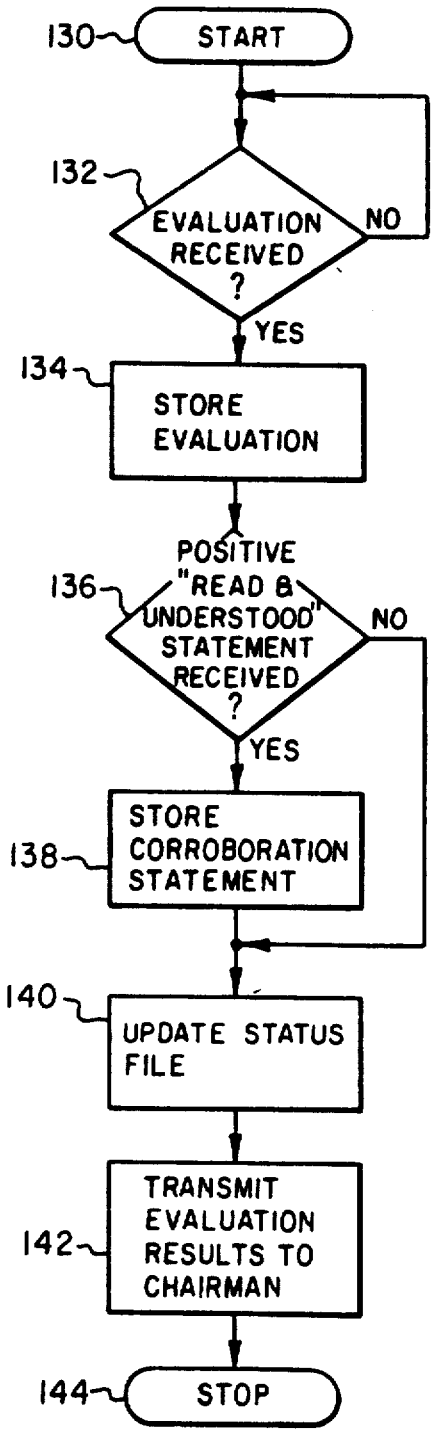
Fig. 4
Fig. 6

```
                    INVENTION DISCLOSURE EVALUATION REPORT                    110

112 — DISCLOSURE NO. _____ DATE _____ TIME _____
      EVALUATOR: JOE EVALUATOR
      CHAIRMAN: SAM CHAIRMAN
114 — I VOTE THAT THIS DISCLOSURE BE RATED AS FOLLOWS:
         SEARCH    PUBLISH    CLOSE    DON'T KNOW    ABSTAIN
         _____    _____    _____    _____    _____
116 — I HAVE READ AND UNDERSTAND THE ENTIRE INVENTION DISCLOSURE:
              YES _____        NO _____
118 — IS FURTHER DISCUSSION NECESSARY:
              YES _____        NO _____
120 — MY LEVEL OF EXPERTISE (1=UNFAMILIAR, 10=EXPERT): _____
122 — COMMENTS _____
      _____
      _____
      _____
```

*Fig. 5*

SYSTEM FOR SELECTING DOCUMENT RECIPIENTS AS DETERMINED BY TECHNICAL CONTENT OF DOCUMENT AND FOR ELECTRONICALLY CORROBORATING RECEIPT OF DOCUMENT

CROSS REFERENCE TO RELATED APPLICATIONS

This application is related to U.S. patent application Ser. No. 07/579,864, now pending, entitled "Method and Apparatus for Automated Document Distribution in a Data Processing System," U.S. patent application Ser. No. 07/579,825, now pending, entitled "Method and Apparatus for Automated Procedure Initiation in a Data Processing System," U.S. patent application Ser. No. 07/579,473, now pending, entitled "Method and Apparatus for Automated Meeting Agenda Generation in a Data Processing System," all filed of even date herewith and assigned to the assignee hereof, and incorporated herein by reference thereto.

BACKGROUND OF THE INVENTION

1. Technical Field

The present invention relates in general to an improved data processing system and in particular to a method and system for corroborating a document within a data processing system. Still more particularly, the present invention relates to a method for automated electronic corroboration of an electronic document within a data processing system.

2. Description of the Related Art

The modern electronic office is rapidly supplanting and replacing many aspects of the traditional paper office. Modern office systems utilize electronic mail, voice mail, centralized databases and other forms of electronic communication to decrease the amount of so-called "float" encountered in a traditional paper society. By utilizing electronic mail it is possible for a document to be simultaneously transmitted to multiple recipients at various points around the world. Despite the advent of widespread electronic communication, selected activities within the traditional paper office have been difficult to implement in an electronic society.

For example, the signature of an individual, long recognized as the best evidence of the originality of a document, or the fact that the individual in question has indeed reviewed a document, is difficult to implement in an electronic office system. While it is true that a hard copy of a document may be created, signed, and subsequently scanned into electronic memory, such procedures are awkward, time consuming and expensive.

While for the most part electronic documents have been widely accepted as the equivalent of their paper counterparts, certain documents which are commonly utilized in the modern office still require some form of corroboration that the document does exist, or did exist as of a selected date. For example, invention disclosure forms utilized to document the conception of an invention are commonly submitted in hard copy form throughout large corporations and almost always include a portion of that document which is intended to be dated and signed by a witness, as evidence of corroboration of the existence of that document. Such corroboration is utilized in case the need ever arises to prove a date of conception of the invention. The processing of an invention disclosure document or other similar document in an electronic office has rendered the corroboration of that document difficult to obtain without creating a hard copy of such a document and filing signed copies.

It should therefore be apparent that a need exists for a method and system whereby electronic documents stored within a data processing system may be readily and efficiently corroborated as a normal course of activity with regard to the processing of such documents. The maintenance of an electronic corroboration of such a document as a normal and ordinary business record should be sufficient to overcome any objection to the electronic nature of the corroboration.

SUMMARY OF THE INVENTION

It is therefore one object of the present invention to provide an improved data processing system.

It is another object of the present invention to provide an improved data processing system which permits the corroboration of a document within the data processing system.

It is yet another object of the present invention to provide an improved data processing system which permits the automated electronic corroboration of an electronic document within the data processing system.

The foregoing objects are achieved as is now described. The method and apparatus of the present invention permit the electronic corroboration of the existence of a document within a data processing system. A selected document is identified and a document profile is created, including at least an identification of the technical or functional area disclosed within that document. Thereafter, the document and document profile are transmitted to an evaluation facility where a unique identifier is assigned to the document and the document is then automatically distributed to a preselected list of users, in accordance with the technical or administrative area information contained within the document profile. Each recipient of the document is then prompted to enter an indication of having read and understood the document at his or her computer terminal. Responses to this prompt are then stored in association with the uniquely identified document so that the document may be electronically corroborated at a subsequent time by a reference thereto. In a preferred embodiment of the present invention, this method and apparatus may be utilized to electronically "witness" an invention disclosure document to corroborate the date of conception of an invention.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a high level flow chart depicting the evaluation and automatic corroboration of an electronic invention disclosure document in accordance with the method and apparatus of the present invention;

FIG. 5 is a pictorial representation of a computer screen which may be utilized to prompt a computer user to evaluate and corroborate an electronic invention disclosure document in accordance with the method and apparatus of the present invention; and FIG. 6 is a high level flow chart depicting the storing of an evaluation and corroboration of an electronic invention disclosure document in accordance with the method and apparatus of the present invention.

DETAILED DESCRIPTION OF PREFERRED EMBODIMENT

Figure 1:
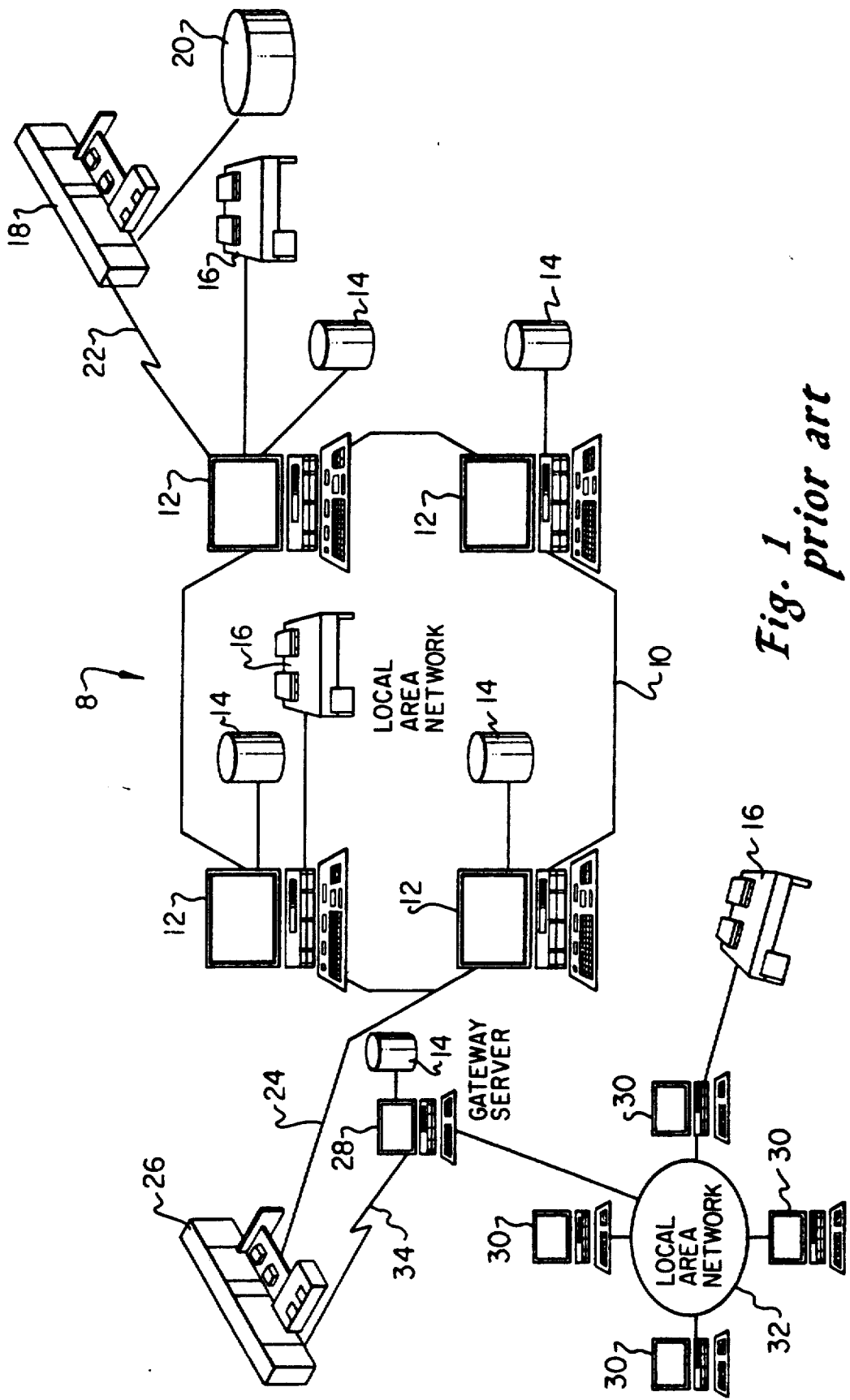
FIG. 1 is a pictorial representation of a distributed data processing system which may be utilized to implement the method of the present invention.

With reference now to the figures and in particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various documents which may be periodically accessed, processed and/or transmitted by a user within data processing system 8, and thereafter corroborated in accordance with the method of the present invention. In a manner well known in the prior art, each such document may be stored within a storage device 14 which is associated with a Resource Manager or Library Service, which is responsible for maintaining and updating all documents associated therewith.

Still referring to FIG. 1, it may be seen that data processing network 8 also include multiple central computer systems, such as central computer system 18, which may be preferably coupled to Local Area Network (LAN) 10 by means of communications link 22. In the preferred embodiment, central computer system 18 is an IBM System/370, although other computer systems, such as an IBM Application System/400 or PS/2 could also be used. In addition, central computer system 18 is not necessary if one or more local area networks are sufficient to connect all desired users. Central computer system 18 may also be coupled to a storage device 20 which may also serve as remote storage for Local Area Network (LAN) 10. Similarly, Local Area Network (LAN) 10 may be coupled via communications link 24 through a subsystem control unit/communications controller 26 and communications link 34 to gateway server 28. Gateway server 28 is preferably an individual computer or Interactive Work Station (IWS) which serves to link Local Area Network (LAN) 32 to Local Area Network 10 such that electronic mail messages may be easily transmitted and received between individuals within either network.

As discussed above with respect to Local Area Network (LAN) 32 and Local Area Network (LAN) 10, a plurality of documents may be stored within storage device 20 and controlled by central computer system 18, as Resource Manager or Library Service for the documents thus stored. Of course, those skilled in the art that central computer system 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network 8 to be able to create or select a document for transfer to other users within data processing network 8. This is generally accomplished utilizing any suitable software application which permits documents, notes or other collections of data to be transmitted or received throughout data processing network 8. Examples of such applications are PROFS, OfficeVision, or CMS note facility used by IBM computers. In the case of invention disclosure documents or other similar documents, the method and apparatus of the present invention will permit an electronic corroboration of such documents to be obtained at a subsequent time.

Figure 2:
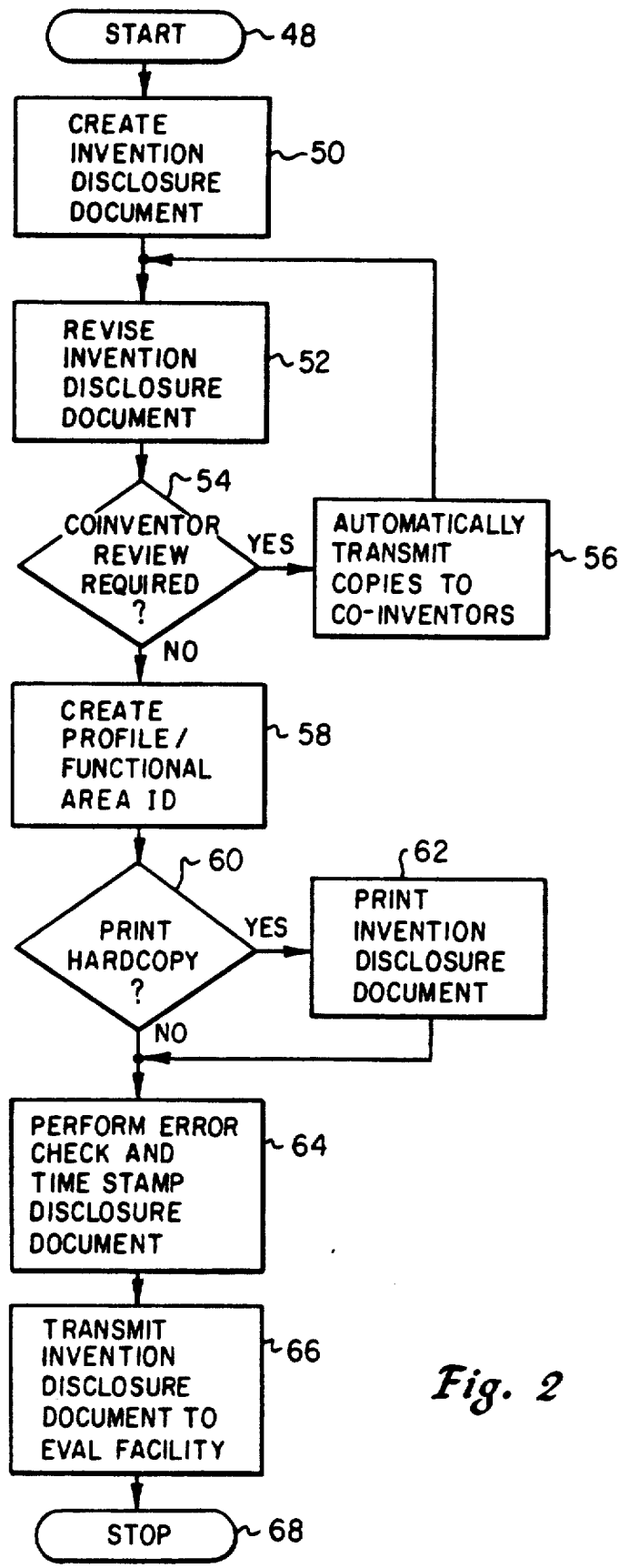
FIG. 2 is a high level flow chart depicting the creation of an electronic invention disclosure document which may be automatically corroborated in accordance with the method and apparatus of the present invention.

Referring now to FIG. 2, there is depicted a high level flow chart which illustrates the creation of an electronic invention disclosure document which may be automatically distributed in accordance with the method and apparatus of the present invention. As is illustrated, the process begins at block 48 and thereafter passes to block 50 which depicts the creation of an invention disclosure document. In the preferred embodiment, the user is prompted for personal information about each inventor, critical dates information about statutory bar dates, and information about the problem solved and the solution. Next, block 52 gives the user the opportunity to revise the invention disclosure document, if such revision is necessary. Block 54 depicts a determination of whether or not co-inventor review is required and if so, the process passes to block 56 which illustrates the automatic transmission of copies of the invention disclosure document to each listed co-inventor. Next, the process returns to block 52 to illustrate the review and revision of the invention disclosure document based upon input from one or more co-inventors.

If, as a result of the determination illustrated in block 54, no additional co-inventor review is required, or all co-inventors have reviewed the invention disclosure document, then the process passes to block 58 which depicts the creation of a document profile/functional area identification. Those skilled in the art will appreciate that the creation of this profile may be accomplished coincident with the creation of the invention disclosure by providing a form document which includes one or more data entry blanks which permit the creator of the document to identify the document by subject matter, author and functional area. Alternatively, as discussed herein, the creator of an invention disclosure document may be presented with a menu screen which lists multiple functional areas from which the document creator may select an appropriate listing. Similarly, a functional area identification may be automatically assigned in response to an examination of personal information inputted for each inventor, such as department number, division, building, et cetera, by correlating the employee's division or department with a functional area identification.

Next, block 60 illustrates a determination of whether or not it is desired to create a hard copy of the invention disclosure document. If so, the process passes to block 62 which depicts the printing of a hard copy of the invention disclosure document. At this point, block 64 depicts the determination of whether or not the invention disclosure document is now in final form and ready to be submitted to an evaluation facility by the performance of an automated error check to determine if all required data for a complete invention disclosure document has been entered. A date/time stamp is also automatically assigned to each invention disclosure document to assist in the management and corroboration of such documents. Thereafter, block 66 illustrates the transmission of the invention disclosure document to an evaluation facility and the process terminates, as depicted in block 68.

While the method and apparatus of the present invention will find application in the automated distribution of any electronic document, the illustrated example discloses the distribution of invention disclosure documents. Accordingly, the revised invention disclosure document and its associated profile/functional area identification information will thereafter be transmitted to an intellectual property law facility for further processing.

In alternate embodiments of the present invention wherein the electronic document to be distributed is a suggestion, the preceding description is also applicable; however, the term "inventor" should be replaced by "suggestor." Further processing of a suggestion will be done by a suggestion evaluation facility, rather than an intellectual property law facility as described herein.

Referring again to FIG. 1, it should be apparent to those skilled in the art that an evaluation facility for such documents may be located at any point within data processing network 8. Often a centralized evaluation facility is utilized for such documents; however, many large corporate entities utilize a decentralized evaluation facility wherein all invention disclosure documents from a particular geographic area are routed to a local evaluation facility.

Figure 3:
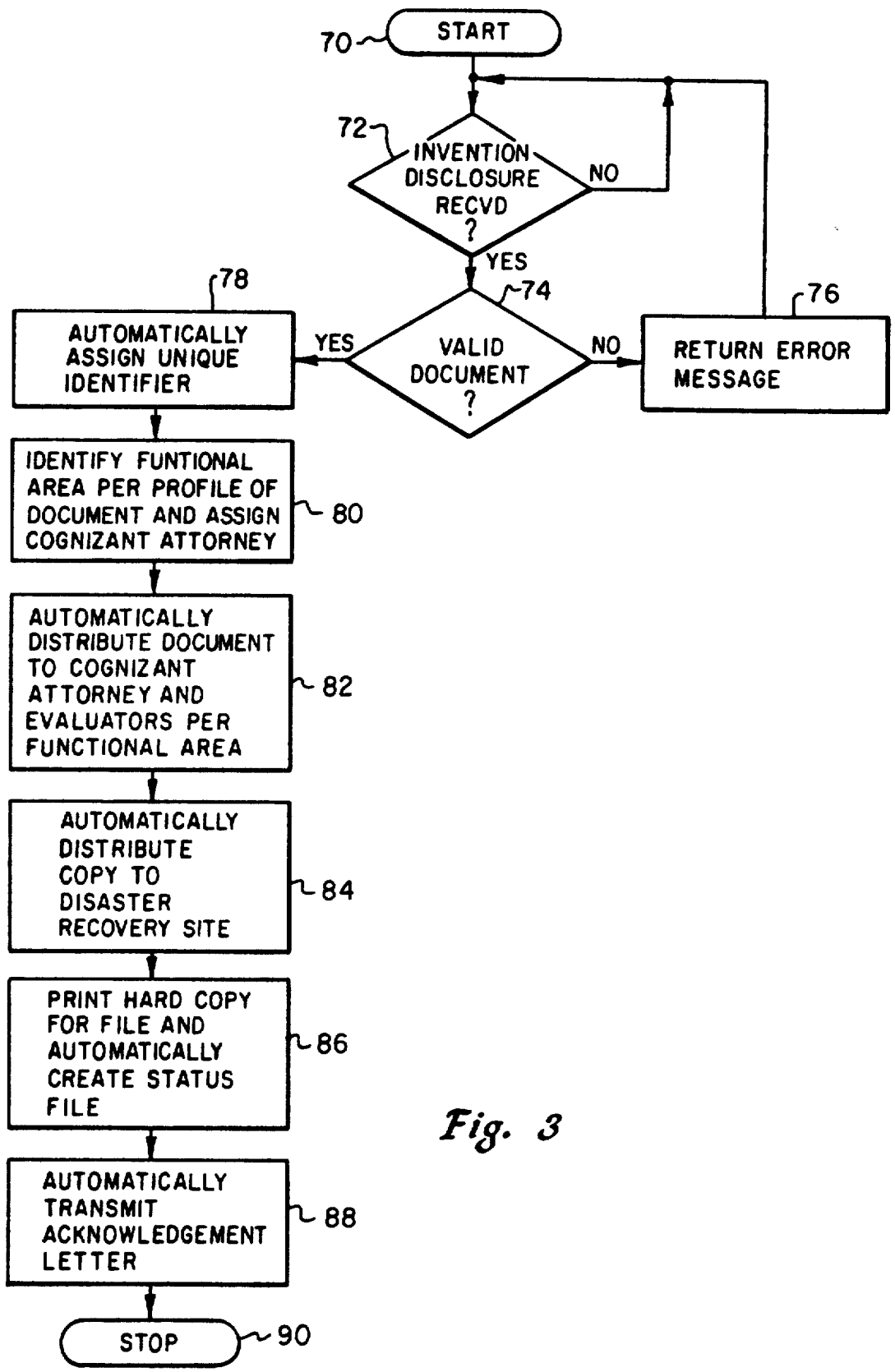
FIG. 3 is a high level flow chart depicting the automatic distribution of an electronic invention disclosure document for corroboration in accordance with the method and apparatus of the present invention.

With reference now to FIG. 3, there is illustrated a high level flow chart which depicts the automatic distribution of an electronic invention disclosure document for evaluation and corroboration, in accordance with the method and apparatus of the present invention. As is depicted, this process begins at block 70 and thereafter passes to block 72 which illustrates a determination of whether or not an invention disclosure document has been received at the evaluation facility. If not, the process merely iterates until such time as this event occurs. After receiving an invention disclosure document at the evaluation facility, block 74 depicts the determination of whether or not the document received is a valid invention disclosure document. That is, whether or not the invention disclosure document is organized in the desired format and includes all required information. If the document received is not valid, an error message is generated, as illustrated in block 76, and the process returns to block 72 to await the receipt of a subsequent invention disclosure document. Next, block 78 depicts the automatic assigning of a unique identifier, such as a disclosure number, to be associated thereafter with the invention disclosure document. In the preferred embodiment, the disclosure number includes an indication of the year the disclosure was received and a four digit number beginning at "0001" and sequentially incrementing each time a new disclosure is received.

At this point, block 80 illustrates the identification of the functional area for the invention disclosure document from the profile information contained with the document and the automatic assignment of a cognizant attorney. Thereafter, block 82 illustrates the automatic distribution of the invention disclosure document to the cognizant attorney and one or more preselected evaluators, determined in accordance with the functional area information contained within the document profile which was developed as discussed herein. This is accomplished by automatically creating a distribution list of appropriate evaluators, along with corresponding electronic addresses, in response to the aforementioned functional area information. In this manner, an invention disclosure document may be efficiently and automatically distributed to a plurality of evaluators for a determination as to the eventual status of the invention disclosure document.

Block 84 then illustrates the automatic distribution of a copy of the invention disclosure document to a disaster recovery site. In this manner, should a fire, earthquake, flood, or other disaster befall the facility which has been utilized to store an invention disclosure document, a copy of that document may be retrieved from a designated disaster recovery site.

Next, block 86 depicts the printing of a hard copy of the invention disclosure document for use in paper files and the automatic creation of a status file to be associated with the uniquely identified invention disclosure document. This status file may be utilized to provide a method for determining the status of an invention disclosure document at any given time. For example, the status file will typically contain the date upon which an invention disclosure document was distributed for evaluation, the dates each evaluator returned a response and any dates which must be met to preserve patentability.

Thereafter, block 88 illustrates the automatic transmission of an acknowledgement letter. Acknowledgement letters are typically sent to the inventors of each invention disclosure document and their management indicating that the document has been received at the evaluation facility and that the document has been distributed for evaluation. Thereafter, this process terminates, as illustrated in block 90.

Referring now to FIG. 4, there is depicted a high level flow chart which illustrates the evaluation and corroboration of an electronic invention disclosure document in accordance with the method and apparatus of the present invention. As above, the process illustrated in FIG. 4 begins at block 92 and thereafter passes to block 94. Block 94 depicts a determination of whether or not an invention disclosure document evaluation request has been received by an evaluator. If not, the process merely iterates until such time as a request for an evaluation of an invention disclosure document is received.

After receiving a request for an invention disclosure document evaluation, block 96 illustrates the obtaining of a copy of the invention disclosure document and the displaying of the disclosure document to the evaluator and/or the printing of a hard copy thereof. Those skilled in the art will appreciate that this may be accomplished utilizing any suitable word processing or text display technique, such as Xedit or browse capability of IBM Operating System CMS. After displaying the disclosure document to the evaluator, block 98 illustrates the prompting of the evaluator for a vote with regard to the proposed status of the invention disclosure document. In the depicted embodiment of the present invention an evaluator may vote to initiate a search of the technology disclosed within the invention disclosure document to investigate possible patentability. The evaluator may also vote to publish the document, close the file, abstain from a vote with regard to a particular invention disclosure document.

Next, in accordance with an important feature of the present invention, block 100 depicts the prompting of the evaluator for a "Read and Understood" statement. This is accomplished, in the depicted embodiment of the present invention, by presenting a computer screen to the evaluator which asks whether the evaluator has read and understood the entire invention disclosure. This prompt requires the evaluator to enter an indication of "yes" or "no" in response to this statement.

Additionally, block 102 illustrates a determination of whether or not the evaluator wishes to enter a comment with regard to an invention disclosure document, in addition to a simple vote and/or corroboration. If so, block 104 depicts the prompting of the evaluator to enter his comments. These comments may be utilized by the Chairman of an Evaluation Committee for a determination of how strongly the evaluator feels with regard to his or her vote, or as part of an agenda to be distributed prior to a scheduled meeting to discuss one or more invention disclosure documents.

Thereafter, block 106 illustrates the transmission of the evaluator's response and comments to the evaluation facility for utilization by the Chairman of the Evaluation Committee. At this point, the process terminates, as illustrated in block 108.

With reference now to FIG. 5, there is depicted a pictorial representation of a computer screen which may be utilized to prompt a computer user to evaluate and corroborate an electronic invention disclosure document in accordance with the method and apparatus of the present invention. As is illustrated, computer screen 110 depicts an INVENTION DISCLOSURE EVALUATION REPORT screen which may be generated for utilization with the method and apparatus of the present invention. At line 112 therein a disclosure number, that is, the unique identification assigned to this disclosure at the evaluation facility, may be entered along with the date and time. Of course, this information may be automatically entered by the system, if so desired.

Line 114 of computer screen 110 illustrates the evaluation vote of the evaluator and requires the evaluator to enter an indication of his or her vote with regard to a particular disclosure. As illustrated, the evaluator may vote to initiate a search to determine possible patentability of the invention disclosure, may indicate that the invention disclosure should be published or closed, may indicate that he or she does not know what status should be assigned the invention disclosure, or may abstain from the vote.

Next, line 116 of computer screen 110 depicts an important statement to be utilized with regard to the automatic corroboration of an invention disclosure document in accordance with the method and apparatus of the present invention. Line 116 requires the evaluator to indicate that he or she has "Read and Understood" the entire invention disclosure, by entering an "X" in the appropriate space. Next, line 118 of computer screen 110 permits the evaluator to make an entry indicating whether or not he or she believes that further discussion is necessary with regard to this invention disclosure.

Line 120 of computer screen 110 permits the evaluator to enter an indication of his or her level of expertise with regard to the technical or functional area of the invention disclosure under consideration. Of course, those skilled in the art will appreciate that it is a simple matter to utilize this indication of expertise as a weighting factor in a voting process involving one or more evaluators with regard to a particular invention disclosure evaluation.

Finally, line 122 of computer screen 110 permits the evaluator to enter narrative comments with regard to a particular invention disclosure. These comments may be utilized by the Chairman of the Evaluation Committee to determine the strength of the evaluator's opinion or for utilization in preparing an agenda for a subsequent meeting, in the event the disposition of a particular disclosure is not clearly determined by the automatic evaluation process.

Finally, referring to FIG. 6, there is depicted a high level flow chart which illustrates the storing of an evaluation and corroboration of an electronic invention disclosure document in accordance with the method and apparatus of the present invention. As above, this process begins at block 130 and thereafter passes to block 132 which illustrates a determination of whether or not an evaluation of a particular invention disclosure document has been received. If not, the process merely iterates until such time as an evaluation is received.

After receiving an evaluation for an invention disclosure document, block 134 depicts the storing of that evaluation. The evaluation of a particular invention disclosure document may be stored at the evaluation facility, at the terminal of the Chairman of the Evaluation Committee, and/or at the disaster recovery site which has been utilized to store the backup copy of the invention disclosure document in question.

Next, block 136 illustrates a determination of whether or not a positive "Read and Understood" statement has been received in response to the prompting of the evaluator, which was depicted in block 98 of FIG. 4. In the event a positive "Read and Understood" statement is not received, the process directly passes to block 140. However, in the event a positive "Read and Understood" statement has been received from the evaluator in response to the prompting referred to above, block 138 illustrates the storing of this corroboration of the invention disclosure document. As above, this corroboration statement may be stored with the invention disclosure document at the evaluation facility, at the terminal of the Chairman of the Evaluation Committee, and/or at the disaster recovery site referred to above.

Next, after storing a positive corroboration statement which has been received, or in the event no positive corroboration statement has been received, block 140 illustrates the updating of the status file which was created as illustrated in block 82 of FIG. 3. As discussed above, this status file contains information regarding the status of a particular invention disclosure document and should thus be updated when an evaluation of the invention disclosure document has been received.

Finally, block 142 illustrates the transmitting of the evaluation results to the Chairman of the Evaluation Committee. This process permits the Chairman of an Evaluation Committee to make a final determination with regard to the status of a particular invention disclosure document, if the voting process has resulted in a clear cut indication of such status, or to schedule a meeting for discussion of a particular invention disclosure document, if the electronic voting process indicates a dichotomy among the members of the Evaluation Committee. Thereafter, as illustrated in block 144, the process terminates.

Upon reference to the foregoing those skilled in the art will appreciate that the Applicants in the present application have provided a novel method and apparatus whereby documents, such as invention disclosure documents, may be automatically distributed to a selected group of computer users and electronically corroborated by those users. This method and apparatus permits the subsequent corroboration of an individual document by a reference to a stored indication of corroboration statements which were generated contemporaneously during an evaluation process. In this manner, should a date of conception or other fact require corroboration such that it may be obtained efficiently by a review of a file associated with that document.

While the invention has been particularly shown and described with reference to a preferred embodiment, it will be understood by those skilled in the art that various changes in form and detail may be made therein without departing from the spirit and scope of the invention.

We claim:

1. A method in a distributed data processing system for selective review and electronic corroboration of invention disclosure documents by multiple users enrolled in said distributed data processing system, said method comprising the steps of:

creating at least one invention disclosure document within said distributed data processing system;

creating a document profile in association with said at least one invention disclosure document, said document profile including an identification of a technical area relating to said at least one invention disclosure document;

transmitting said at least one invention disclosure document to an invention disclosure evaluation facility enrolled within said distributed data processing system;

automatically assigning a unique identifier to said invention disclosure document upon receipt of said invention disclosure document at said evaluation facility and thereafter automatically distributing said uniquely identified invention disclosure document to a preselected list of users enrolled within said distributed data processing system, said preselected list of users determined in response to said identification of said technical area within said document profile;

prompting each of said preselected list of users to enter an indication of having read and understood said uniquely identified invention disclosure document; and automatically storing only each positive response to said prompting in association with said uniquely identified invention disclosure document wherein said uniquely identified disclosure document may be electronically corroborated at a subsequent time by a reference thereto.

2. A data processing system for selective review and electronic corroboration of invention disclosure documents by multiple users enrolled in a distributed data processing system, said data processing system comprising:

means for permitting a user to create at least one invention disclosure document within said distributed data processing system;

means for creating a document profile in association with said at least one invention disclosure document, said document profile including an identification of a technical area relating to said at least one invention disclosure document;

means for transmitting said at least one invention disclosure document to an invention disclosure evaluation facility enrolled within said distributed data processing system;

means for automatically assigning a unique identifier to said invention disclosure document upon receipt of said invention disclosure document at said evaluation facility and thereafter automatically distributing said uniquely identified invention disclosure document to a preselected list of users enrolled within said distributed data processing system, said preselected list of users determined in response to said identification of said technical area within said document profile;

means for prompting each of said preselected list of users to enter an indication of having read and understood said uniquely identified invention disclosure document; and means for automatically storing only each positive response to said prompting in association with said uniquely identified invention disclosure document wherein said uniquely identified disclosure document may be electronically corroborated at a subsequent time by a reference thereto.

* * * * *